Sept. 23, 1969 D. J. BAILLIE 3,468,432
CONTROLLED FORCE FRICTION DRAFT GEAR
Filed Nov. 6, 1967 2 Sheets-Sheet 1
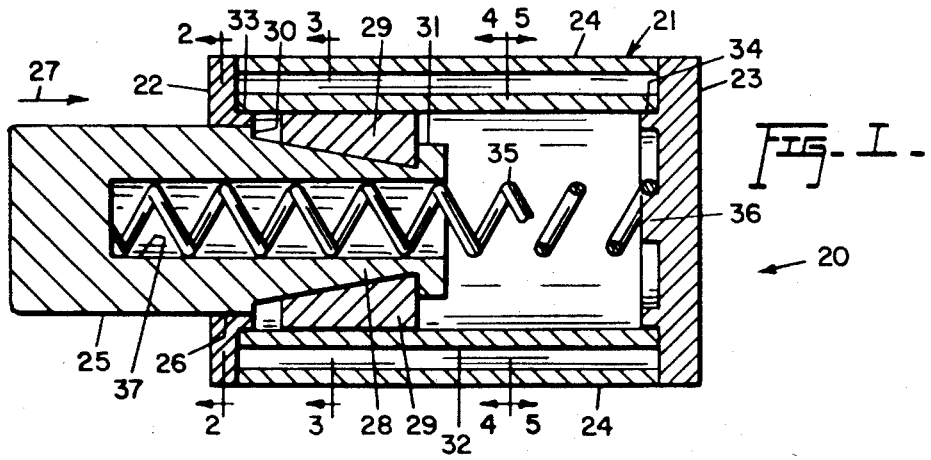
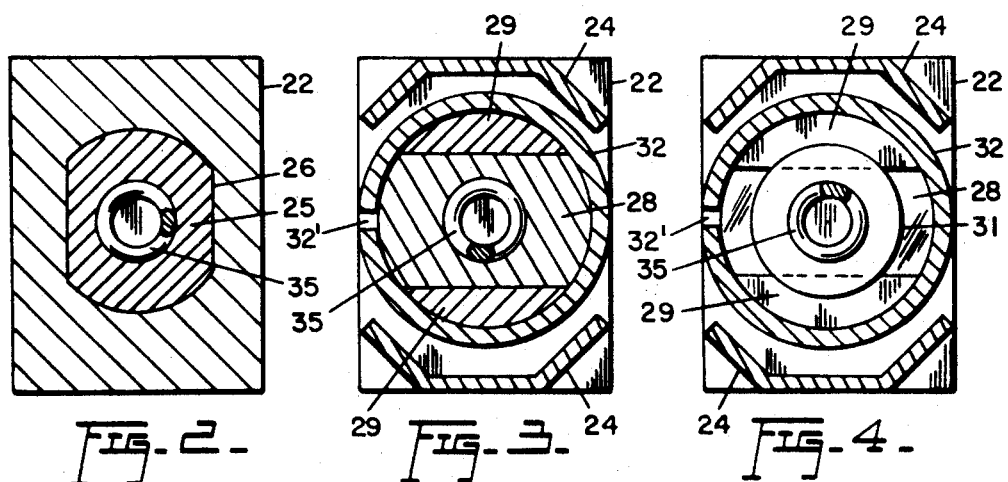
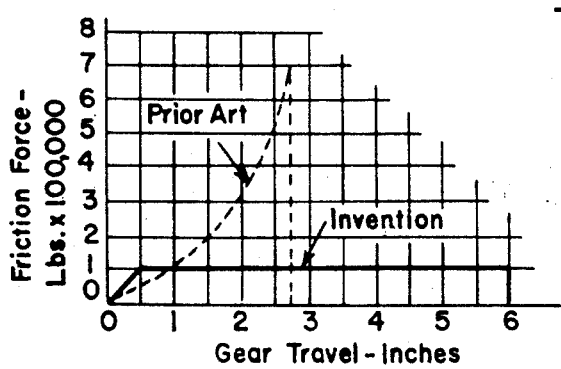
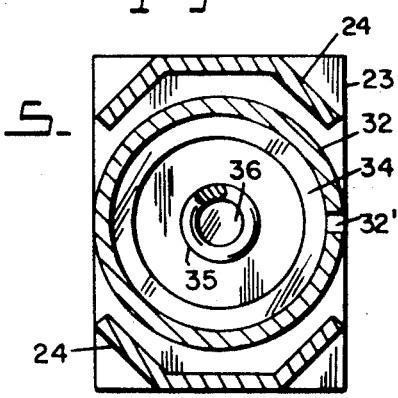
INVENTOR
DOUGLAS J. BAILLIE
BY Fetherstonhaugh & Co.
ATTORNEYS Sept. 23, 1969     D. J. BAILLIE     3,468,432
CONTROLLED FORCE FRICTION DRAFT GEAR
Filed Nov. 6, 1967     2 Sheets-Sheet 2
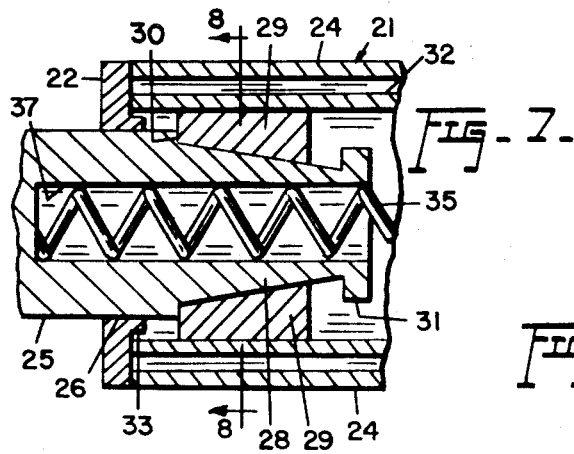
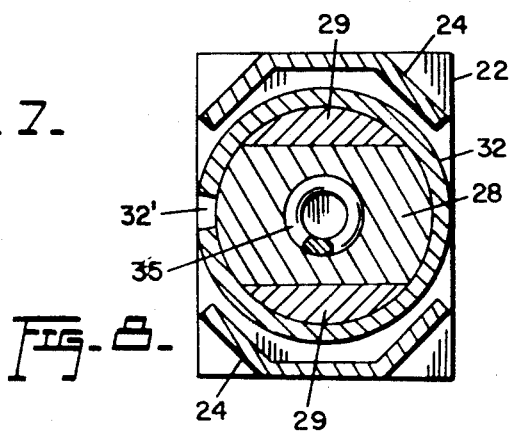
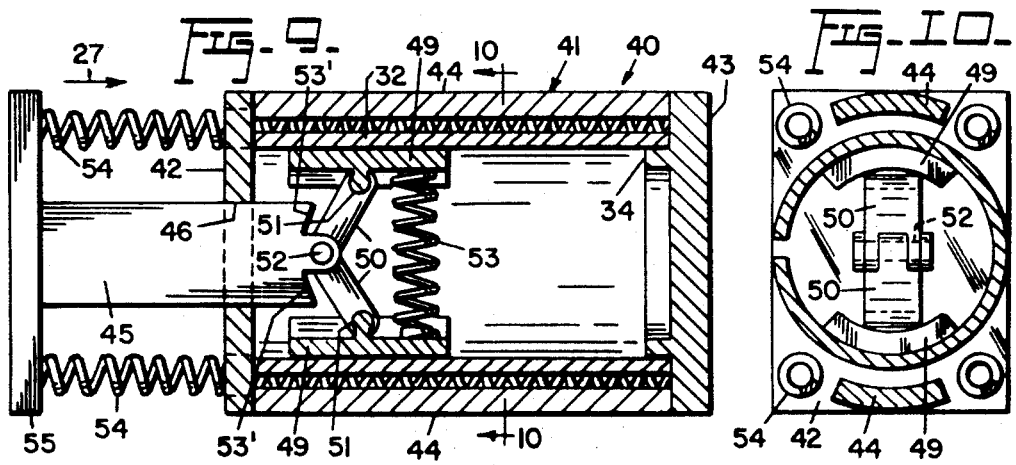
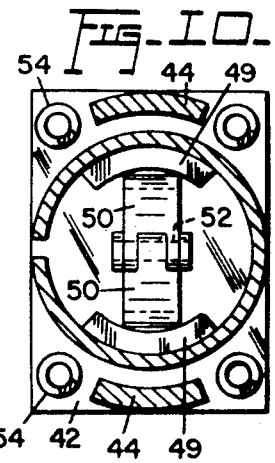
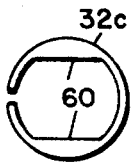
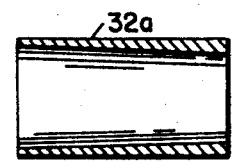
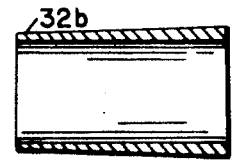
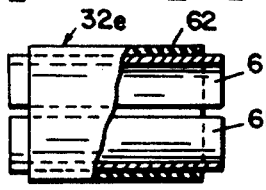
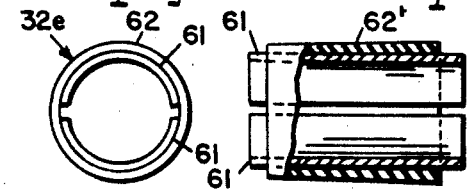
INVENTOR
DOUGLAS J. BAILLIE
BY Featherstonhaugh & Co.
ATTORNEYS United States Patent Office 3,468,432
Patented Sept. 23, 1969

3,468,432
CONTROLLED FORCE FRICTION DRAFT GEAR
Douglas J. Baillie, 1470 Calidonia Ave.,
Mount Royal, Quebec, Canada
Filed Nov. 6, 1967, Ser. No. 680,733
Int. Cl. B61g 11/02, 9/10
U.S. Cl. 213—37   14 Claims

ABSTRACT OF THE DISCLOSURE

Longitudinally split tubular spring means positioned in a case which has a slidable plunger extending thereinto. Shoes actuated by the plunger during its inward movement are urged radially outwardly into frictional engagement with the spring means, so that the spring means are radially expanded against resilient bias thereof to a contracted position. Relatively weak resilient means are used for sliding the plunger outwardly when application of inward force on the plunger is discontinued.

---

This invention relates to new and useful improvements in friction draft gear used on railroad vehicles for absorbing energy and minimizing damaging effects of impact when two or more such vehicles are coupled together.

Generally speaking, conventional draft gear of the friction type consists of a coil spring positioned in a case and bearing against shoes which operatively engage a slidable wedge. When the wedge is slid inwardly by reaction forces developed at the coupler due to impact, the spring is compressed and the resultant spring force combined with the impact reaction forces causes the wedge to urge the shoes into frictional engagement with the case, whereby the energy of impact is absorbed.

Conventional draft gears of this type are available in different capacities from 20,000 foot pounds to 60,000 foot pounds, and the American Association of Railroads states that a maximum reaction force of 50,000 pounds shall not be exceeded when capacity of the gear is specified. Accordingly, conventional draft gears are designed to offer a resistive friction force of 500,000 pounds, since in this manner the maximum capacity limit as set by the Association can be claimed.

Draft gear capacity is a function of the friction force developed and the length of travel of the gear. This capacity is restricted not only by the aforementioned friction force limit, but also by the fact that draft gear in dimensional conformity to specifications of the American Association of Railroads has a maximum travel of only about 2¾ inches, the rest of the space in the case of the gear being taken up by the solid length of the component parts. Significantly, the limitations are most adversely affected by the conventional use of a large, long and powerful coil spring behind the wedge and shoes in the gear case. This substantially reduces the length of gear travel and also gives rise to development of low resistive forces early, and very large resistive forces late in the travel, so that the resistive force development is uneven and not subject to effective control. Also, the large coil spring stores energy which is subsequently released back to the coupler, thus creating an undesirable condition. The low resistive forces developed early in the travel of conventional draft gear are not as effective as they could be, while the very high forces developed late in the travel are such that lading is likely to be damaged even if the draft gear has not become solid, that is, incapable of further movement. For any particular vehicle and lading there is a threshold force which the combination car and lading can tolerate without damage. If the impact forces reaching the car are below this level, the lading is safe, but if they are above that level, damage to the lading will ensue. With the foregoing in mind, it is the principal object of the invention to provide improved draft gear which is capable of developing a friction force slightly less than the threshold force and which can maintain the friction force constant throughout the length of travel of the gear. Inasmuch as actual threshold force level varies from lading to lading, draft gears of the invention may be designed to provide different capacities, as for example, development of a constant force of 100,000 or 200,000 or 300,000 pounds each with a travel of 6 inches, thus furnishing a capacity of 50,000 or 100,000 or 150,000 foot pounds, respectively.

Another important object of the invention is to avoid the limitations imposed by the conventional coil spring on the length of the gear travel, as well as its undesirable effect of returning stored energy to the coupler, so that greater gear travel is possible and so that absorbed energy is not released in a detrimental manner.

Although the draft gear of the invention can maintain friction force constant throughout travel of the gear, another object of the invention is to provide certain modified embodiments wherein the friction force is progressively increased with the gear travel, but in an effectively controlled manner dictated by design of the gear.

Briefly, the foregoing objects of the invention are attained by utilizing, in place of the conventional coil spring, longitudinally split tubular spring means which, rather than being longitudinally compressed, are radially expanded by frictional engagement of the shoes therewith. As such, the tubular spring means contain the shoes without detracting from effective travel of the gear, and energy absorbed by the spring means during radial expansion is harmlessly released during radial contraction without being returned to the coupler. Also, by utilizing tubular spring means of uniform wall thickness throughout its length, constant friction force may be maintained throughout the travel of the gear. On the other hand, with tubular spring means having longitudinally tapered wall thickness, the developed friction force may be progressively increased from the start to the end of the gear travel. By comparison to conventional gears which have a travel of only about 2¾ inches, the gear of the invention may have 6-inch travel in a 24-inch case, or a 12-inch travel in a 36-inch case, as desired, the capacity of the gear being directly related to the amount of travel.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 1 is a longitudinal sectional view showing one embodiment of the draft gear of the invention;

FIG. 2 is a cross-sectional view, taken substantially in the plane of the line 2—2 in FIG. 1;

FIG. 3 is a cross-sectional view, taken substantially in the plane of the line 3—3 in FIG. 1;

FIG. 4 is a cross-sectional view, taken substantially in the plane of the line 4—4 in FIG. 1;

FIG. 5 is a cross-sectional view, taken substantially in the plane of the line 5—5 in FIG. 1;

FIG. 6 is a diagram showing the relation of friction force to gear travel;

FIG. 7 is a fragmentary longitudinal sectional view showing the embodiment of FIG. 1 in an expanded position;

FIG. 8 is a cross-sectional view, taken substantially in the plane of the line 8—8 in FIG. 7;

FIG. 9 is a longitiudinal sectional view showing a modified embodiment of the draft gear;

FIG. 10 is a cross-sectional view, taken substantially in the plane of the line 10—10 in FIG. 9;

FIG. 11 is a longitudinal view in section, on a reduced scale, showing a tapered force control member;

FIG. 12 is a view similar to that in FIG. 11 but showing another form of a tapered force control member;

FIG. 13 is an end view on a reduced scale, showing another modified control member;

FIG. 14 is an end view, similar to that in FIG. 13 but showing another modification;

FIG. 15 is a view, partly inside elevation and partly in longitudinal section, of a control member embodying a liner and a resilient garter;

FIG. 16 is an end view of the subject shown in FIG. 15; and

FIG. 17 is a view similar to that in FIG. 15, but showing another modified embodiment.

Referring now to the accompanying drawings in detail, more particularly to FIGS. 1–5 inclusive, one embodiment of the draft gear according to the invention is designated generally by the reference numeral 20. The draft gear as a whole cooperates with the usual coupler and coupled yoke of a railroad vehicle in the conventional manner which is well known in the art and therefore does not require to be illustrated or described herein.

The draft gear 20 embodies in its construction an elongated case 21, consisting of a pair of end plates 22, 23 and a pair of trough-shaped longitudinal members 24 which extend between and are rigidly secured to the end plates in any suitable manner. As such, the case need not be fully closed as it is in conventional draft gears, but may have open sides between the longitudinal members 24, as shown. The end plate 22 of the case is oriented toward the coupler shank (not shown), while the plate 23 is engageable by the yoke of the coupler (also not shown), and a plunger 25 is slidable through an opening 26 formed in the plate 22, being slid inwardly into the case as indicated by the arrow 27 by reaction forces at the coupler when two or more cars are coupled together.

The inner end portion of the plunger 25 is in the form of a wedge 28 cooperating with a pair of shoes 29. If two such shoes are used in diametrically opposite relation, the wedge has two inclined surfaces, but three or more shoes may be utilized, in which event the number of inclined surfaces on the wedge is increased accordingly. The wedge 28 is provided with projecting shoulders 30, 31 to limit the extent of relative movement in a longitudinal direction between the wedge and the shoes.

In conventional practice a heavy coil spring is positioned in the case behind the shoes and wedge, but the essence of the invention resides in eliminating such a spring and substituting therefor a longitiudinally split, tubular spring member 32, the longitudinal split of which appears at 32'. The spring member 32 is radially expansible, but is biased to its radially contracted position by its inherent resiliency. Conveniently, the member 32 may be made of spring steel, although other materials may be employed, as for example, glass-fiber which recently was successfully utilized in the construction of so-called glass-fiber sleeve springs. In any event, the radially expansible and contractible spring member 32 extends the full length of the case between the end plates 22, 23 and the end plates are preferably provided with annular protuberances 33, 34, respectively, for seating the ends of the spring member in its contracted position and for retaining the same in the case substantially concentrically with the wedge 28 and shoes 29.

When the draft gear is in use and reaction forces are developed at the coupler due to impact, the plunger 25 is slid inwardly in the case 21 as indicated by the arrow 27. During this movement the shoes 29 move along the inclines of the wedge 28 from the position shown in FIG. 1 to that shown in FIG. 7, wherein the shoes abut the shoulder 30 of the wedge. Movement of the shoes along the wedge causes the shoes to also move radially outwardly against the spring member 32, which is thereby radially expanded at the split 32' against its own resiliency, and the resistive force of the spring member against expansion provides the required spring force to absorb the energy of impact. It is significant to note that such spring force is developed within a very short portion of the total travel of the gear, and that once the shoes 29 come into abutment with the shoulder 30, maximum expansion of the spring member 32 has been attained and a further build-up of spring force is impossible. Thus, the draft gear of the invention provides the distinctly desirable charatceristic of achieving the maximum spring force as early as possible in the gear travel, without going beyond an acceptable spring force limit.

Once the maximum spring force has been attained as above described further application of force to the plunger in the direction of the arrow 27 will cause the wedge 28 and shoes 29 to slide inwardly together within the spring member 32, and a friction force will be developed between the spring member and the shoes. Inasmuch as the spring member is providing a constant spring force, the developed friction force will also be constant and will so remain for the full travel of the gear.

When the impact is over and application of force to the plunger 25 in the direction of the arrow 27 is discontinued, the spring force stored in the member 32 will cause the shoes 29 to move along the wedge 28 until the shoes abut the shoulder 31 and the energy stored in the spring member will be dissipated by radial contraction of the spring member to its initial position wherein it is seated against the annular protuberances 33, 34.

In order to return the plunger 25 to its initial position at that time, a relatively weak coil spring 35 is provided, one end of this spring being seated around a central boss 36 on the end plate 23, while the other end portion of the spring extends into a blind bore 37 formed in the wedge 28 and plunger 25, as shown. The sole purpose of the spring 35 is to slide the plunger, wedge and shoes outwardly to the position shown in FIG. 1 after the impact is over and the spring member 32 has contracted as already explained, it being important to note that the energy stored in the spring member during expansion is harmlessly dissipated during contraction without being returned to the coupler. The coil spring 35 is relatively weak and whatever energy is stored therein during compression is substantially spent during expansion in sliding the wedge, shoes and plunger outwardly, and thus the energy returned to the coupler by the spring 35 is virtually insignificant.

Attention is now directed to FIGS. 9 and 10 which show a modified embodiment of the draft gear designated generally by the numeral 40. The same consists of a case 41 including a pair of end plates 42, 43 and longitudinal members 44, together with a plunger 45 slidable through an opening 46 in the plate 42. The longitudinally split tubular spring member 32 is provided in the case as in the embodiment previously described, and in its contracted position is seated on the annular protuberance 34 on the end plate 43.

However, in this instance the plunger 45 does not have a wedge and the shoes 49 are operatively connected to the inner end of the plunger by a pair of links 50, the latter being pivotally connected to the shoes as at 51 and to the plunger as at 52. A relatively weak compression spring 53 is interposed between the shoes 49 to sustain the same in engagement with the spring member 32.

In operation, application of impact force to the plunger 45 in the direction of the arrow 27 will slide the plunger 45 inwardly in the case and movement of the pivot 52 in the direction of the pivots 51 will cause the links 50 to press the shoes 49 radially outwardly and the spring member 32 will become expanded until the links 50 come into abutment with limit shoulders 53' provided on the plunger 45, at which point maximum expansion of the spring member and development of maximum spring force will be attained. Further inward sliding of the plunger will cause the shoes 49 to slide inwardly in the spring member and a friction force will be developed such force again being constant for the full travel of the gear, as already explained in connection with the embodiment 20.

Relatively weak coil springs 54 are interposed between the end plate 43 and an abutment plate 55 provided at the outer end of the plunger 45, the springs 54 serving to return the plunger to its initial, outwardly slid position after application of inward impact force on the plunger has ceased and the shoes 49 have become retracted radially inwardly by constraction of the spring member 32. Unlike in the embodiment 20 where the plunger return spring 35 is disposed inside the case, the springs 54 in the embodiment 40 are disposed exteriorly of the case and are thus readily available for inspection and/or replacement.

It may be also noted that the initial included angle between the links 50 is increased when the plunger 45 is first slid by the impact force in the direction of the arrow 27, inasmuch as the friction force developed between the shoes and the spring member 32 increases at a more rapid rate than an increase in the impact load. However, when the links 50 come into abutment with the shoulders 53', maximum expansion of the spring member and maximum friction force are attained, as already described.

FIG. 6 diagrammatically shows the relationship between friction force and gear travel of the draft gear of the invention utilizing a radially expansible and contractible spring member, as compared to draft gear of the prior art utilizing a longitudinally compressible and expansible coil spring. It will be noted that in conventional draft gear the friction force rises progressively along a curve to a maximum of 700,000 pounds at the end of a maximum travel limit of 2¾ inches, and that during the early part of travel the friction force is not as high as it should be. On the other hand, the draft gear of the invention attains a maximum friction force of, for example, 100,000 pounds within the first half inch of travel when the spring becomes fully expanded, and that friction force remains constant for the full travel of 6 inches.

FIGS. 11–17 illustrate some modified arrangements of the spring member of the invention. In some instances where maintaining of a constant friction force for the full length of gear travel is desirable, the spring member 32 has a uniform wall thickness throughout its length, as in FIGS. 1 and 9. However, if it should be preferred to progressively increase the friction force as the length of travel increases, the wall thickness of the spring member may increase, as for example, FIG. 11 shows a spring member 32a with a tapered wall, the thickness of which increases in the longitudinal direction, that is, toward the end plate 23 or 43, when the spring member is installed. The progressively increasing wall thickness enables the spring member 32a to offer progressively greater resistance to radial expansion, so that a progressively greater friction force is developed with increasing length of travel of the gear. In its relaxed form, the spring member 32a has a cylindrical outer surface and a longitudinally tapered inner surface, but the same result can be obtained by the spring member 32b shown in FIG. 12, wherein the outer surface is tapered and the inner surface is cylindrical in the relaxed form of the member. Spring members such as 32a and 32b may develop a friction force of 100,000 pounds at maximum expansion at the beginning of the stroke, and 50,000 pounds for the same amount of expansion at the end of the stroke.

FIGS. 13 and 14 show spring members 32c and 32d, respectively, which are provided at the inside thereof with flat surfaces 60 for engagement by the shoes, if it is desired to have shoes with flat outer faces instead of convex faces to improve the effectiveness of the friction contact. The member 32c has two flat surfaces for cooperation with two shoes, it being understood that two, three or more shoes may be used, as for example, three shoes with the member 32d which has three flat surfaces. Also, the spring members 32c and 32d may have a uniform wall thickness throughout their length for development of a constant friction force, or they may be tapered as the members 32a or 32b, if development of progressively increasing friction force is desired.

In another modified embodiment, the spring member may consist of a plurality of components as shown in FIGS. 15–17. In such an arrangement the spring member 32e comprises a metallic inner liner which, in this instance is shown as being composed of two, complemental semi-cylindrical liner portions 61 which are not inherently resilient, but are surrounded by an elastic garter 62 made of any suitable elastomeric material. The garter 62, being tubular in form, resists radial separation of the liner portions 61 and thus provides the required spring force in the same manner as the aforementioned spring member 32 which is inherently resilient. In FIGS. 15 and 16 the garter 62 has a uniform wall thickness throughout its length for development of a constant friction force, while the garter 62' in FIG. 17 is tapered to provide a progressively increasing wall thickness for development of progressively increasing friction force, as already explained in connection with FIGS. 11 and 12.

Manifestly, the liner in FIGS. 15–17 may comprise two or more of the liner portions 61 disposed in complemental, cylindrical form and surrounded by the elastic garter 62, the latter serving to provide the required spring force as aforesaid, while the liner affords the required structural strength and good wearing surfaces for the shoes. If desired, the liner portions 61 may have concave inner surfaces or they may have flat inner surfaces for engagement by flat shoes, as in the instance of the spring members shown in FIGS. 13 and 14.

Both structural embodiments of the invention as represented by FIGS. 1 and 9 are arranged so that when the gear becomes "solid," that is, not capable of further movement under the impact force, further load will pass directly through the case 21 or 41 to the car structure. Thus, the spring member 32 and the return springs 35 or 54 will never be subjected to high stress levels, as is the instance in conventional draft gears employing longitudinally compressible coil springs. When a solid condition is encountered in the embodiment of FIG. 1, the end portion 31 of the wedge 28 will come into abutment with the end plate 23. Similarly, in the embodiment of FIG. 9, the shoes 49 will come into abutment with the annular protuberance 34 on the end plate 43.

It may be pointed out that although the invention is primarily directed to railroad draft gear, its use is not restricted to this environment and the invention may be used in other environments where it is desired to absorb the impact of collision of two or more bodies.

While in the foregoing there have been described and shown the preferred embodiments of the invention, various modifications may become apparent to those skilled in the art to which the invention relates.

What is claimed as new is:

1. Controlled friction force draft gear comprising in combination, an abutment plate, longitudinally split substantially tubular open-ended force control means having one end thereof in abutment with said plate, said force control means being radially expansible and resiliently biased to a radially contracted position, a plunger slidable axially through the other end of said force control means, a set of shoes operatively connected to said plunger and urged thereby radially outwardly into frictional engagement with said force control means to radially expand the same against its resilient bias to a predetermined extent of radial expansion during initial axially inward sliding movement of said plunger in the direction of said abutment plate, stop means for limiting radially outward movement of said shoes and hence the extent of radial expansion of said force control means so that after the initial sliding movement of the plunger the latter and the shoes may slide toward said abutment plate without further radial expansion of said force control means, and resilient means separate from said force control means for returning said plunger and shoes axially to their initial position when application of inward force on the plunger is discontinued and said shoes have permitted said force control means to become radially contracted.

2. The device as defined in claim 1 wherein said force control means comprise a longitudinally split tubular member of resiliently yieldable material, said member being biased to its radially contracted position by its inherent resiliency.

3. The device as defined in claim 2 wherein said member has a uniform wall thickness in the longitudinal direction.

4. The device as defined in claim 2 wherein said member has a longitudinally tapered wall increasing in thickness in the direction of said abutment plate.

5. The device as defined in claim 1 wherein said force control means comprise at least one member having a curved cross-section corresponding to at least a segment of a tube, and a resilient garter extending around said member for biasing the same to its contracted position.

6. The device as defined in claim 5 wherein said member has a uniform wall thickness in the longitudinal direction.

7. The device as defined in claim 5 wherein said member has a longitudinally tapered wall increasing in thickness in the direction of said abutment plate.

8. The device as defined in claim 1 wherein said substantially tubular force control means are provided with flat, longitudinally extending inner surfaces engageable by said shoes.

9. The device as defined in claim 1 together with a wedge provided on said plunger in said case, said shoes having inclined surfaces in engagement with said wedge whereby the shoes are radially expanded against said force control means when the plunger is moved inwardly.

10. The device as defined in claim 9 wherein said stop means are constituted by shoulders provided on said plunger at the large end of the inclined surfaces of said wedge, said shoulders being engageable by said shoes when the latter have reached the limit of their radially outward movement.

11. The device as defined in claim 10 together with additional shoulders provided on said plunger at the small end of the inclined surfaces of said wedge, said additional shoulders being engageable with said shoes to slide the same axially outwardly with said plunger to their initial position under the action of said resilient means.

12. The device as defined in claim 11 together with a set of divergent links pivotally connected to said plunger and to the respective shoes, and resilient means sustaining the shoes in engagement with said force control means whereby the shoes are radially expanded against the force control means when the plunger is moved inwardly.

13. The device as defined in claim 12 wherein said stop means are constituted by shoulders provided on said plunger, said shoulders being engageable by said links when said shoes have reached the limit of their radially outward movement.

14. The device as defined in claim 1 together with an elongated gear case enclosing said force control member, said abutment plate constituting one end of said gear case and the other end thereof having an end plate provided with an opening through which said plunger slidably projects, and annular protuberances provided in opposing relation on said abutment plate and on said end plate of the gear case, said protuberances being disposed interiorly of and in supporting relation with end portions of said force control member when the latter is radially contracted.

References Cited

UNITED STATES PATENTS

| | | | |
|---|---|---|---|
| 2,487,028 | 11/1949 | O'Connor | 267—9 |
| 2,554,561 | 5/1951 | Dath | 213—32 |

DRAYTON E. HOFFMAN, Primary Examiner

U.S. Cl. X.R.

213—22, 32; 267—1